July 4, 1967 M. L. LEVENE ETAL 3,329,942

AIR BEARING DATA STORAGE APPARATUS

Filed Jan. 29, 1958

INVENTORS.
Martin L. Levene &
Carl Lauxen
BY Morris L. Rabkin
ATTORNEY.

3,329,942

AIR BEARING DATA STORAGE APPARATUS

Martin L. Levene, Philadelphia, Pa., and Carl Lauxen, Haddonfield, N.J., assignors to Radio Corporation of America, a corporation of Delaware Filed Jan. 29, 1958, Ser. No. 711,862
9 Claims. (Cl. 340—174.1)

This invention relates to data storage apparatus, and particularly to data storage apparatus using a movable member.

In certain applications, it is desirable to: (1) store data or information at high speed; (2) to minimize any modulation or variation in the signal representing the information by the storage apparatus, and (3) precisely to time or clock the entry and withdrawal of the information to and from the storage apparatus. In certain prior storage apparatus, for example, a magnetic drum, synchronous electrical motors are used to supply the driving force for the movable drum member. Signal variation may be compensated for by using relatively complex electronic circuitry at the output of the apparatus. One way of accurately timing the entry and withdrawal of the information is to use relatively complex servo mechanisms to accurately control the speed of the electric motor. Another way of timing the entry and withdrawal of the information is to divide the movable member into discrete locations and to use a separate signal to identify each different location. The latter solution to the timing problem is not readily adaptable for use in storage apparatus wherein the data or the information is represented by a time-varying, modulated wave.

It is an object the present invention to provide an improved data storage apparatus using a movable member which obviates the disadvantages of prior apparatuses of similar type.

Another object of the present invention is to provide an improved high-speed data storage apparatus which simplifies the problem of timing the entry and withdrawal of information.

Still another object of the present invention is to provide an improved data storage apparatus of the magnetic-disc type wherein the information read out is substantially a replica of the information read into the apparatus.

A further object of the present invention is to provide an improved means for driving a data storage apparatus at high speeds.

According to the present invention, the movable member of the storage apparatus is driven by a turbine actuated by a pressurized fluid such as compressed air. The movable member and the turbine may be mounted in a fixed member. During operation, pressurized fluid radial and thrust bearings preferably are provided between the fixed member, the movable member, and the turbine. These bearings float the turbine and the movable member within the fixed member. A relatively close spacing between the fixed and the movable members is provided by a thin film of pressurized fluid between the members.

A feature of the invention is that the pressurized bearings act to maintain the alignment of the members even when the apparatus is used in an adverse environment, such as one causing mechanical vibrations of the parts.

Figure 1:
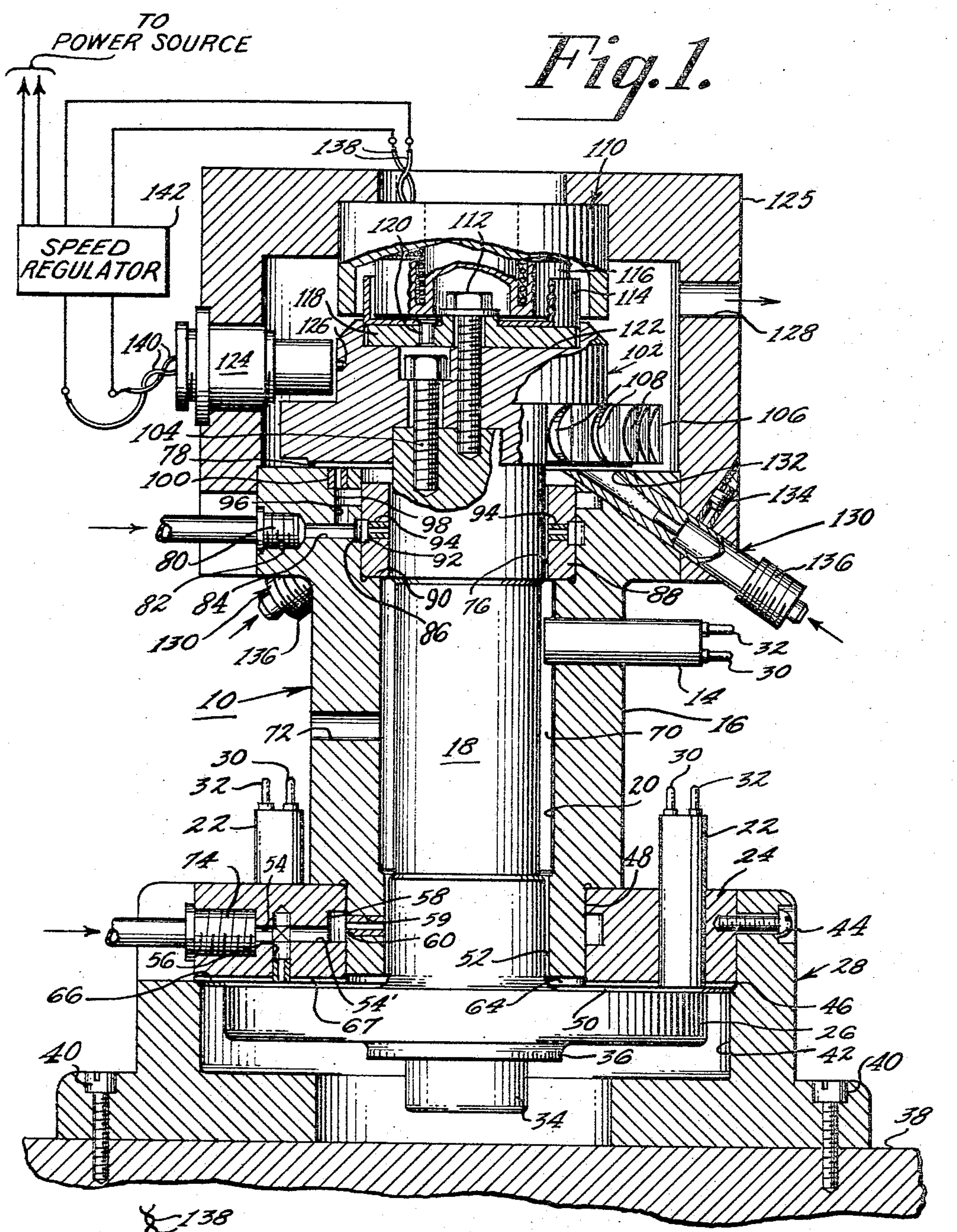
Figure 2:
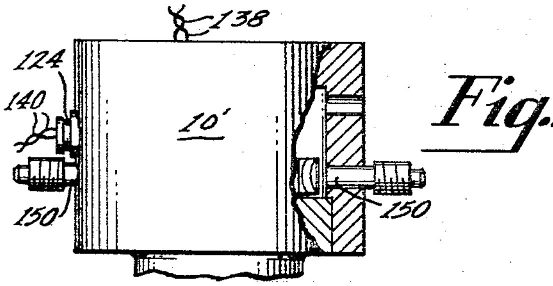

In the accompanying drawing:

FIG. 1 is an elevational view, partially in section, of a data storage apparatus according to the invention, and FIG. 2 is a fragmentary view, partially in section, of a modified form of the storage apparatus of the invention.

The storage apparatus 10 of FIG. 1 may be used as a drum-type or a disc-type storage apparatus. In drum-type apparatus, transducing means 14 are mounted in the fixed member shown as a hollow cylindrical sleeve 16.

The transducing means 14 cooperate with a retentive material carried by the movable member shown as a solid cylindrical shaft 18 fitted within the through-bore 20 of the sleeve 16. In disc-type apparatus, transducing means 22 are mounted in an annular head support piece 24 for cooperation with a retentive material on the top surface of disc 26. The disc 26 is rotated within the through-bore of a cylindrical side support piece 28.

Magnetizable material may be used as the storage medium, and magnetic record-read heads may be used for the transducing means 14, 22. Each of the magnetic heads 14, 22 is provided with a pair of electrical terminals 30, 32. Signals representing information to be stored, and signals corresponding to stored information are respectively applied to, or taken from, the head terminals 30, 32. Any suitable known circuitry may be used for gating signals to and from the heads 14, 22.

The shaft 18 and the disc 26 are made from a single piece of material such as aluminum. Preferably, the single piece is solid, as shown, becase of the high speeds desired. However, in certain applications involving lower speeds, the single piece may be hollow. For ease of machining and for mechanical strength, the shaft 18 has a lower portion 34 extending beyond the bottom surface of the disc 26. A shoulder 36 is integral with the bottom surface of the disc 26 and the lower portion 34 of the shaft 18. The portions 34 and 36 of the shaft 18 also facilitate balancing, if required, of the rotating portion of the apparatus. Thus, the portions 34, 36 of the piece provide additional material, conveniently located, which may be removed during a balancing operation.

A horizontal base support member 38 supports the shaft 18 and the disc 26 for rotation about a vertical axis. Any suitable means, such as screws 40, may be used to fasten the side piece 28 to the base support 38. The head support piece 24 is fastened within the through-bore 42 of the shoulder piece 28 by any suitable means such as screws 44. The upper portion of the side piece 28 is counter-bored to provide a seat 46 for the head support piece 24. The head support piece 24 is fastened by any suitable means, such as a press fit, to an undercut portion 48 of the sleeve 16.

A channeling network is provided in the head support piece 24 and the undercut portion 48 of the sleeve 16 to permit the introduction of pressurized fluid into a lower thrust-bearing space 50 and a lower radial bearing space 52. A plurality of spaced radial channels 54 are bored in the head support piece 24. Each of these radial channels 54 connects with a different one of a like plurality of axial channels 56 in the head support piece 24. In addition, one of the radial channels 54' is extended to an annular groove 58 cut in the inner surface of the head support piece 24. Radial channels 59 are bored in the lower portion 48 of the sleeve 16 at the location of the groove 58. Axial orifice inserts 60 connect the axial channels 56 in the head support piece 24 to the thrust-bearing space 50. Radial orifice insert pieces 60 in the radial channels 59 connect the annular groove 58 with the lower radial-bearing space 52. Radial slots 66 are cut in the bottom surface of the head support piece 24 to provide thrust-bearing pads 67 and to channel the pressurized fluid from the thrust-bearing space 50 to an inner relief space 64. The relief space 64 and the thrust-bearing space connect with a middle relief space 70 between the central portions of the shaft 18 and the sleeve 16. Radial channels 72 connect the middle relief space 70 to the atmosphere. A separate inlet connector 74 is threaded in the outer portion of each radial channel 54 in the head support piece 24. If desired, a common external connection, not shown, may be used to conduct the pressurized fluid to all the inlet connectors 74.

Another channeling network is provided in the upper portion of the sleeve 16 to permit introduction of pressurized fluid to an upper radial-bearing space 76 and to an upper thrust-bearing space 78. A common inlet connector 80 is threaded in an inlet port 82 drilled in the upper portion of the sleeve 16. Any suitable conduit or hose may be used for connecting a source, not shown, of pressurized fluid to the upper inlet port 82. A radial channel 84 connects the inlet port 82 to an annular groove 86 in the inner surface of the upper portion of the sleeve 16. An annular ring 88 is seated against a seat 90 provided by counter-boring the upper portion of the sleeve 16. An annular groove 92 in the ring 88 matches with the annular groove 86 in the sleeve 16. Radial orifice insert pieces 94 connect the groove 92 with the upper radial-bearing space 76. An axial channel 96 connects the radial channel 84 in the upper portion of the sleeve 16 to another annular groove 98 in the sleeve 16. Orifice inserts 100 connect the groove 98 to the upper thrust-bearing space 78.

A turbine device is mechanically coupled to the upper end of the shaft 18. In the specific illustrative embodiment, the turbine device is a reaction type turbine. However, other known turbine devices may be used if desired.

In FIG. 1, a turbine spindle 102 is fastened to the upper end of the shaft 18 by any suitable means, such as a bolt 104. Fastened to the spindle 102 is a turbine wheel 106 having buckets 108 formed therein. A magnetic hysteresis brake 110 is fastened to the turbine spindle 102 by any suitable means such as a bolt 112. The hysteresis brake 110 includes a rotor 114 and a stator 116. A spacer washer 118 is fastened against the bottom surface of the rotor 114 by any suitable means such as rivets 120. The washer 118 is seated against a seat 122 provided by counter-boring the top portion of the spindle 102.

A reluctance pickup means 124 is fastened to an end cap 125 to cooperate with a hole 126 drilled in the spindle 102. The end cap 125 is provided with a radial channel 128 for conducting the pressurized fluid from the interior of the apparatus 10 to the atmosphere. Turbine nozzles 130 are fixed in annular holes drilled through the end cap 125 and the sleeve 16. The mouth 132 of each nozzle 130 is flared for better distribution of the pressurized fluid against turbine buckets 108. Set screws 134 are used to prevent rotation of the nozzles 130. Threaded couplings 136 are used to connect the nozzles 130 with any suitable source, not shown, of pressurized fluid. The signal leads 138 of the hysteresis brake 110 are brought out from the top of the end cap 125. Signals from the reluctance pickup 124 are taken across pickup leads 140.

After assembly, the unitary shaft and disc and the bolted turbine spindle provide a rugged unit adapted to rotate at high speeds, say 60,000 r.p.m. and upwards. The spacer washer 118 is used as a coarse adjusting means for obtaining a desired spacing between the top surface of the disc 26 and the transducing means 22.

In operation, pressurized fluid is applied to the inlet connectors 74 and 80 to provide pressurized fluid bearings in the radial spaces 52 and 76 and in the thrust-bearing spaces 50 and 78. The fluid bearings operate to float the inner rotatable portion of the apparatus 10. A convenient pressurized fluid is compressed air. The compressed air, preferably, is filtered prior to its entry into the inlet connectors 74 and 80. Suitable air filters are commercially available.

After the compressed air is applied to the inlet connectors 74 and 80, pressurized fluid is applied to the turbine nozzles 130. The turbine pressurized fluid also may be compressed air suitably filtered. The compressed air from the throats of the nozzles 130 strike the buckets 108, rotating the shaft 18 and the disc 26 relative to the transducing means 14 and 22.

Preferably, the compressed air supply for the turbine is arranged to be fully on or fully shut off. The desired rotational speed of the apparatus is controlled by the speed regulator 142. Each time the turbine spindle 102 completes one revolution, a pulse is induced in the signal leads 140 of the reluctance pickup means 124. These induced pulses are applied to the speed regulator 142. The regulator 142 is well-known in the servomechanisms art. Briefly, the regulator counts the pulses from the signal leads 140 to determine the actual rotational speed of the apparatus 10. The actual speed then is compared with the desired speed previously set into the regulator 140. A signal representing the difference is applied by the regulator 142 to the signal leads 138 of the hysteresis brake 110. The brake 110 then applies a force in the proper direction to slow the rotational speed of the apparatus 10 to the desired speed. Because the apparatus 10 is driven by compressed air, the drift or speed variations due to changes in the drive air pressure, temperature, etc., occur over a relatively long time-constant. This means that the speed regulator 142 can be relatively simple in construction. For example, electric synchronous motors operated at high speed have a relatively short time constant with respect to speed variations or jitter. Thus, a faster operating and a more sensitive speed regulator is required when synchronous motors are used.

The relatively long time-constant with respect to speed variation is important in certain applications. Thus, in certain applications, amplitude modulations, phase shift, etc., of the recorded signal are intolerable. In such applications, conventional storage apparatus driven by synchronous motors may be unacceptable even when complex and expensive auxiliary circuits are provided. For example, the undesired jitter of high-speed motors occurs within the frequency range of the recorded signal. However, the speed variations, if any, of the storage apparatus of the present invention occur within a frequency range widely separated from that of the recorded signal.

In one specific embodiment of the invention, the storage apparatus was rotated at 60,000 r.p.m. A pair of pulses of different amplitudes were recorded on the disc 26, using a different transducing means 22 for each pulse. The pair of pulses then were read out of the disc 26, using the same transducing means 22, and applied to an oscilloscope. No pulse jitter or amplitude modulation could be observed in the oscilloscope traces throughout the duration of the test which lasted approximately five minutes. Those skilled in the art will readily appreciate that such test results do not occur in conventional storage apparatus of the movable type even when sensitive, fast-response speed regulators are used.

A further advantage of the apparatus of the invention is that the pressurized radial bearings act automatically to maintain the shaft 18 concentric within the sleeve 16. Thus, the apparatus is relatively insensitive to mechanical vibrations. Also, relatively close spacing between the transducing means 22 and the disc 26 can be achieved. In the specific apparatus referred to above, a spacing of 200 microinches or less was achieved. This close spacing means that the apparatus can be used to store information in a higher frequency range than is the case where larger spacings are used. Close spacing also provides an improved signal-to-noise ratio. The appaartus of FIG. 1 may be modified in various ways within the scope of the invention. For example, the nozzles of the turbine may be located perpendicular to the turbine wheel, as shown in FIG. 2, for the nozzles 150 and the turbine wheel. The remaining parts of the apparatus 10' may be the same as those for the apparatus 10 of FIG. 1. By so locating the nozzles 150, equal and opposite forces are applied to the upper radial bearings, thereby reducing the pressure tending to break down the air film flowing in the upper radial-bearing spaces.

There have been described herein novel storage apparatus capable of operating at high speeds without adversely affecting the recorded signal. The apparatus of the present invention extends the usefulness of storage apparatus of the movable type by an appreciable amount beyond that of prior-art storage apparatuses of similar type.

What is claimed is:

1. Data storage apparatus for storing electric signals comprising a first rigid member for recording information, a second member for supporting transducing means for recording on said first member, means for rotating said members relative to each other at a constant speed such that the time constant of speed variations of said members is relatively long compared to the time constant of said electric signals, said rotating means including a turbine device mechanically coupled to one of said members to form a unitary structure, and means for applying pressurized fluid to rotate said structure at said constant speed.

2. In data storage apparatus for storing electric signals having first and second rigid members one of which is used for storing information and the other of which is used for supporting transducing means for coupling to said first member, the improvement comprising a turbine wheel fastened to one of said members for rotating said one member relative to the other of said members to form a unitary structure, and means for applying pressurized fluid to rotate said turbine wheel and said one member at a constant speed such that the time constant of speed variations of said members is relatively long compared to the time constant of said electric signals.

3. In data storage apparatus for storing electric signals, the combination of a fixed member and a rigid rotatable member mounted for rotation within said fixed member, said rotatable member carrying a recording medium, transducing means fastened in said fixed member for coupling to said medium, pressurized fluid bearings for supporting said rotatable member, a turbine device fastened to said rotatable member, and means for applying pressurized fluid to said turbine device to cause said rotatable member to rotate at a constant speed such that the time constant of speed variations of said members is relatively long compared to the time constant of said electric signals.

4. In data storage apparatus, the combination as claimed in claim 3, said turbine device including a turbine wheel having an axis, and said means for applying pressurized fluid including turbine nozzles fastened in said fixed member, each of said nozzles having an axis angularly related to the axis of said turbine wheel.

5. In data storage apparatus, the combination as claimed in claim 4, wherein the axis of each of said turbine nozzles is perpendicular to the axis of said turbine wheel.

6. In data storage apparatus for storing electric signals, the combination of a rigid movable member carrying a magnetic recording medium and mounted for rotation within a fixed member, magnetic transducing means fastened in said fixed member for coupling to said medium, a pair of pressurized fluid radial bearings and a pair of pressurized fluid thrust bearings for supporting said movable member within said fixed member, channeling networks within said fixed member for supplying pressurized fluid to said pressurized bearings, a turbine device fastened to said rotatable member, and means for applying pressurized fluid to said turbine device to rotate said wheel and said movable member at a constant speed such that the time constant of speed variations of said members is relatively long compared to the time constant of said electric signals.

7. In data storage apparatus, the combination as claimed in claim 6, said rotatable member having a flat surface on which said magnetic recording medium is carried, and said fixed member having an inner flat surface opposite that of said movable member, wherein the bearing surfaces of one of said thrust bearings are respectively the recording medium and the flat inner surface of said fixed member.

8. Data storage apparatus for storing electric signals comprising a first rigid member for recording information,
transducing means,
a second member for supporting transducing means for recording on said first member,
means for rotating said first member relative to the other,
said rotating means including a turbine device mechanically coupled to said first member to form a unitary structure,
and means for applying pressurized fluid to rotate said first member at a constant speed.

9. Data storage apparatus comprising in combination, a first rigid member,
a recording medium supported in intimate contact with said first rigid member during recording,
transducing means,
a second member for supporting said transducing means for coupling to said recording medium,
a turbine device mechanically coupled to one of said members to form a unitary structure therewith so as to rotate said second member and said recording medium relative to each other, and
means for applying pressurized fluid to said turbine device to rotate said turbine device at a constant speed.

References Cited

UNITED STATES PATENTS

| | | | |
|---|---|---|---|
| 2,062,632 | 7/1952 | Serduke et al. | 308—9 |
| 2,652,554 | 9/1953 | Williams | 340—172.5 |
| 2,671,700 | 3/1954 | Seyffert | 340—174.1 |
| 2,694,192 | 11/1954 | Dean | 340—174 |
| 2,787,750 | 4/1957 | Jones | 340—174 X |
| 2,899,260 | 8/1959 | Farrand et al. | 308—9 |

FOREIGN PATENTS

| | | |
|---|---|---|
| 1,106,477 | 12/1955 | France. |

OTHER REFERENCES

Autonetics, pp. 1 to 9, Aug. 21, 1957—"Air-Floating Disk Magnetic Memory Unit" by W. A. Farrand.

BERNARD KONICK, *Primary Examiner.*

IRVING L. SRAGOW, EVERETT R. REYNOLDS, STEPHEN W. CAPELLI, BERNARD KONICK, *Examiners.*

J. VOGEL, N. N. KUNITZ, T. W. FEARS, *Assistant Examiners.*